(No Model.) 2 Sheets—Sheet 1.

J. BARDSLEY.
CLOAK RACK.

No. 340,753. Patented Apr. 27, 1886.

WITNESSES:
Edward Wolff
Chas. C. Gill

INVENTOR
Joseph Bardsley (No Model.)
J. BARDSLEY.
CLOAK RACK.
No. 340,753. Patented Apr. 27, 1886.
2 Sheets—Sheet 2.
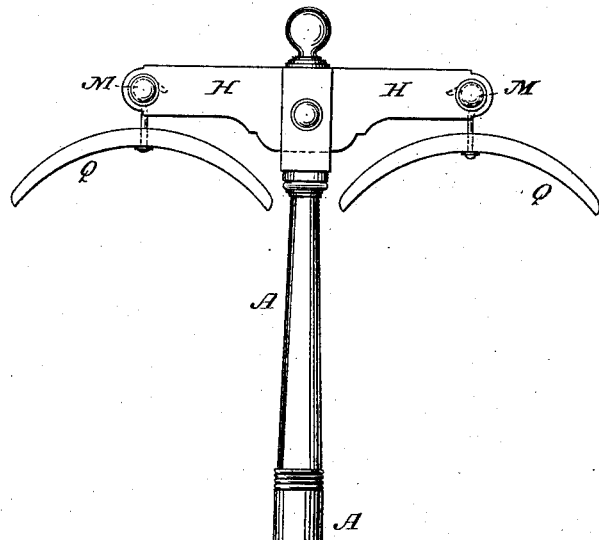
Fig. 4.
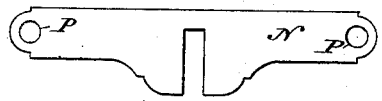
Fig. 5.
Fig. 6.
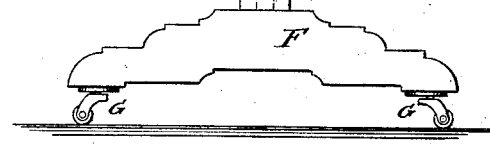
WITNESSES:
Edward Wolff
Chas. C. Gill
INVENTOR
Joseph Bardsley

UNITED STATES PATENT OFFICE.

JOSEPH BARDSLEY, OF NEWARK, NEW JERSEY.

CLOAK-RACK.

SPECIFICATION forming part of Letters Patent No. 340,753, dated April 27, 1886.

Application filed November 7, 1885. Serial No. 182,104. (No model.)

*To all whom it may concern:*

Be it known that I, JOSEPH BARDSLEY, a citizen of the United States, and a resident of Newark, in the county of Essex and State of New Jersey, have invented certain new and useful Improvements in Cloak-Racks, of which the following is a specification.

The invention relates to improvements in cloak-racks; and its object is the production for use in cloak manufacturing or selling houses of a rack which will be strong, effective, will occupy the minimum amount of space, and be capable of sustaining the maximum quantity of goods. The particular method of constructing and employing the rack which is the subject of this application will be pointed out hereinafter, and is illustrated in the accompanying drawings, in which—

Figure 1:
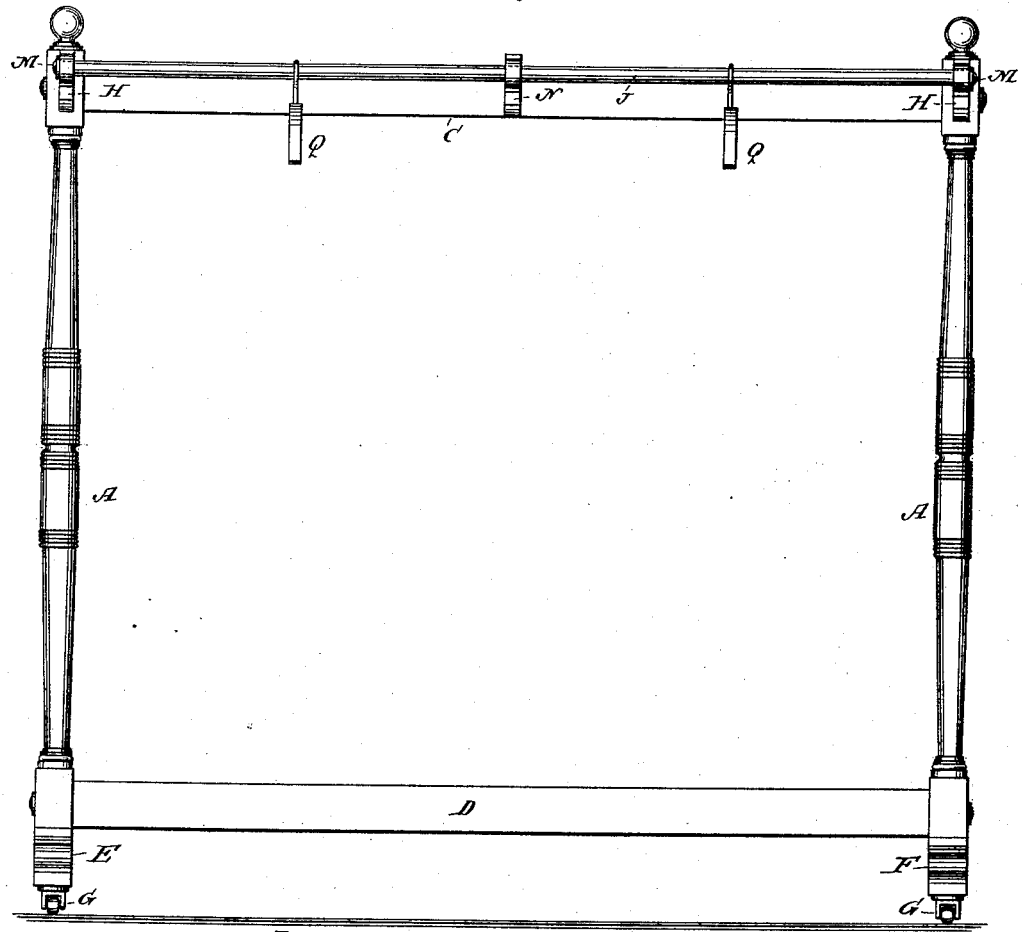
Figure 2:
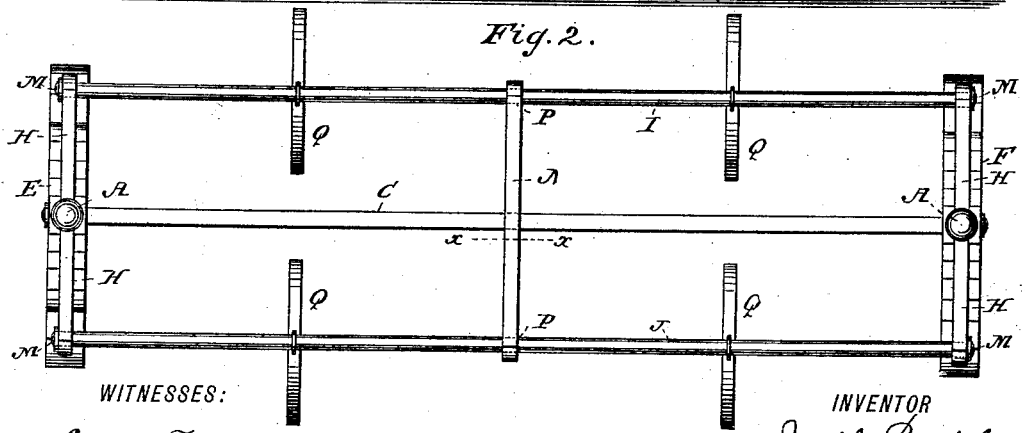
Figure 3:

Figure 1 is a side elevation of a rack embodying the invention. Fig. 2 is a top view of same. Fig. 3 is a detached sectional view on the line $x$ $x$ of Fig. 2. Fig. 4 is an end view of the rack, shown on an enlarged scale. Fig. 5 is a detached side view of the brace N, hereinafter referred to; and Fig. 6 is a detached view of the central part of bar C, also referred to hereinafter.

In the drawings, A designates the two side standards, of appropriate size and appearance, connected near their upper and lower ends by the bars lettered C D, respectively, and provided on their lower ends with feet E F, of suitable form and dimensions, and mounted upon casters G, which permit the stand to be readily moved from place to place on the floor of the store.

Each of the standards A is provided adjacent to its upper end with the transverse arms H H, extending outward on each side thereof, and corresponding with each other in form and dimensions. The arms H H on one standard A are connected with the similarly-lettered arms on the other standard by two rods, I J, the ends of which enter apertures in the ends of said arms, as shown by dotted lines in the drawings, the apertures being afterward covered on the outer faces of the arms by ornamental caps M. It is essential that the rods I J be properly strengthened at their center, so as to enable them to withstand the heavy weight of the cloaks without being strained or bent; and to this end a brace, N, is provided, which will preferably correspond in general form with the arms H H. The ends of the brace N extend laterally from the connecting-bar C, and are provided in their extremities with the apertures P, through which the rods I J pass, and by which they are held at about their center, as indicated by dotted lines in Figs. 1 and 2.

The center of the brace N is slotted on its lower edge, to enable it to pass down on opposite sides of the bar C, and the upper edge of the bar C is notched, as shown by dotted lines in Fig. 3, to afford a seat for the brace and prevent it from shifting laterally or being twisted by any undue weight that may be placed on either of the rods I J.

The brace N serves to strengthen and sustain the rods I J and to distribute the strain from the weight of the cloaks or analogous goods between them. The weight on one rod would have a tendency to bow it downward; but, through the medium of the brace N, this weight is sustained not only by the strength of the one bar, but also by the resistance of the other bar against an upward strain.

The cloaks or analogous goods to be hung upon the rack are suspended on shoulders Q, which are hooked over the rods I J, as shown in the drawings. The shoulders Q will be arranged close to each other along the full length of the rods I J, and each will receive a cloak, the four shoulders shown being presented merely as illustrating the relation of the shoulders to the rods.

What I claim as my invention, and desire to secure by Letters Patent, is—

1. A cloak-rack consisting of the standards mounted upon feet and connected by strengthening-bars, combined with the arms H H, rods I J, and brace N, the rods being retained in apertures in the ends of said arms and brace, substantially as set forth.

2. A cloak-rack consisting of the standards mounted upon feet and connected by bars C D, combined with the arms H H, brace N, and rods I J, the brace passing down on each side of and being seated in the bar C, the whole being constructed and arranged substantially as and for the purposes set forth.

Signed at New York, in the county of New York and State of New York, this 5th day of November, A. D. 1885.

JOSEPH BARDSLEY.

Witnesses:
CHAS. C. GILL,
HERMAN GUSTOW.